US012418099B2

(12) United States Patent
Wu

(10) Patent No.: US 12,418,099 B2
(45) Date of Patent: Sep. 16, 2025

(54) ANTENNA DEVICE AND MOBILE TERMINAL

(71) Applicant: GUANGDONG OPPO MOBILE TELECOMMUNICATIONS CORP., LTD., Dongguan (CN)

(72) Inventor: Xiaopu Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 86 days.

(21) Appl. No.: 18/385,051

(22) Filed: Oct. 30, 2023

(65) Prior Publication Data

US 2024/0063527 A1 Feb. 22, 2024

Related U.S. Application Data

(63) Continuation of application No. PCT/CN2022/080623, filed on Mar. 14, 2022.

(30) Foreign Application Priority Data

Apr. 30, 2021 (CN) ......................... 202110484710.6

(51) Int. Cl.
*H01Q 1/24* (2006.01)
*H01Q 1/48* (2006.01)
*H01Q 5/35* (2015.01)

(52) U.S. Cl.
CPC ............... *H01Q 1/243* (2013.01); *H01Q 1/48* (2013.01); *H01Q 5/35* (2015.01)

(58) Field of Classification Search
CPC ............ H01Q 1/243; H01Q 1/48; H01Q 5/35; H01Q 3/24; H01Q 21/28; H01Q 9/42; H01Q 1/242; H01Q 1/36; H01Q 5/307; H01Q 21/00
See application file for complete search history.

(56) References Cited

U.S. PATENT DOCUMENTS 10,312,585 B2 * 6/2019 Wu ........................ H01Q 1/242
10,978,788 B2 * 4/2021 Liu ........................ H01Q 21/28
2018/0026346 A1 1/2018 Lee et al.

FOREIGN PATENT DOCUMENTS

CN 108172996 A 6/2018
CN 109546311 A 3/2019
CN 111509369 A 8/2020
(Continued)

OTHER PUBLICATIONS

Wu et al. (English translation of CN 112086753) (Year: 2020).*
(Continued)

*Primary Examiner* — Seung H Lee
(74) *Attorney, Agent, or Firm* — Sheppard, Mullin, Richter &Hampton LLP

(57) ABSTRACT

Provided is an antenna device. The antenna device includes a first antenna. The first antenna includes a first radiator. The first radiator includes a first branch and a second branch that are connected to each other. The second branch bends and extends from an end of the first branch. The first antenna supports both a first operation mode and a second operation mode. The first antenna covers a bandwidth greater than 190 MHz by using the first operation mode and the second operation mode together. In addition, a mobile terminal is provided.

18 Claims, 10 Drawing Sheets

100

(56) References Cited

FOREIGN PATENT DOCUMENTS

| | | | | | |
|---|---|---|---|---|---|
| CN | 111628298 | A | | 9/2020 | |
| CN | 111769849 | A | | 10/2020 | |
| CN | 112086753 | A | | 12/2020 | |
| CN | 212434835 | U | | 1/2021 | |
| CN | 112615136 | A | | 4/2021 | |
| CN | 112653488 | A | | 4/2021 | |
| EP | 3367497 | A1 | * | 8/2018 | ............... H01Q 1/22 |

OTHER PUBLICATIONS

The First Office Action from corresponding Chinese Application No. 202110484710.6 dated Jul. 31, 2024.

International Search Report and Written Opinion dated Jun. 6, 2022 in International Application No. PCT/CN2022/080623. English translation attached.

Chinese Second Office Action for Chinese Application No. 202110484710.6 mailed on Jan. 9, 2025 (19 pages).

Chinese Rejection decision, Chinese Application No. 202110484710.6, mailed Apr. 28, 2025 (20 pages).

* cited by examiner

| Combination | First antenna | Second antenna | Third antenna |
|---|---|---|---|
| 1 | First diversity reception signal, second diversity reception signal | Second primary reception signal | First primary reception signal |
| | First diversity reception signal, second primary reception signal | Second primary reception signal | Second diversity reception signal |
| 2 | First diversity reception signal, second diversity reception signal | Second primary reception signal | First primary reception signal |
| | First primary reception signal, second diversity reception signal | Second primary reception signal | First diversity reception signal |
| | First diversity reception signal, second primary reception signal | Second diversity reception signal | First primary reception signal |
| 3 | First diversity reception signal, second diversity reception signal | Second primary reception signal | First primary reception signal |
| | First primary reception signal, second diversity reception signal | First diversity reception signal | Second primary reception signal |

FIG. 11

ANTENNA DEVICE AND MOBILE TERMINAL

CROSS-REFERENCE TO RELATED APPLICATIONS

This application is a continuation of International Application No. PCT/CN2022/080623 filed on Mar. 14, 2022, which claims a priority to and benefit of Chinese Patent Application No. 202110484710.6, filed with China National Intellectual Property Administration on Apr. 30, 2021, the entire content of which is incorporated herein by reference.

FIELD

The present disclosure relates to the field of communications, and more particularly, to an antenna device and a mobile terminal.

BACKGROUND 5-th Generation Mobile Communication Technology (5G) mobile networks include a Standalone mode and a Non-Standalone mode. Due to high costs of the Standalone mode, mobile terminals such as cell phones currently mainly use the Non-Standalone mode to save costs. In the Non-Standalone mode, a 4-th Generation Mobile Communication Technology-Long Term Evolution (4G-LTE) and 5G-New Radio (NR) dual connectivity (ENDC mode) is usually implemented.

In the related art, a plurality of Lower Band (LB, or low-frequency) antennas can be set up in the mobile terminal to implement the ENDC mode. LB refers to a band within which a frequency is lower than 1,000 MHz. However, due to limitations of an accommodation space of the mobile terminal and an influence of electromagnetic radiation of antennas, the mobile terminal in the ENDC mode can only implement L+L (4G LTE low-frequency+5G NR low-frequency dual connectivity) communication in a specific band.

SUMMARY

In view of the above problems, the present disclosure aims to solve at least one of the problems in the related art to some extent. To this end, objects of the present disclosure are to provide an antenna device and a mobile terminal.

An antenna device of the present disclosure includes a first antenna including a first radiator. The first radiator includes a first branch and a second branch that are connected to each other. The second branch bends and extends from an end of the first branch. The first antenna supports both a first operation mode and a second operation mode. The first antenna covers a bandwidth greater than 190 MHz by using the first operation mode and the second operation mode together.

A mobile terminal of the present disclosure includes a main body and the above-mentioned antenna device. The main body includes a short edge and a side edge. The first branch and the second branch are respectively disposed at the short edge and the side edge that are adjacent to each other.

A mobile terminal of the present disclosure includes a first antenna, a second antenna, and a third antenna. The mobile terminal is configured to communicate a first band signal and a second band signal through the first antenna, the second antenna, and the third antenna, to implement a full-band 4G low-frequency and 5G low-frequency dual connectivity or a full-band low-frequency carrier aggregation, or the mobile terminal is configured to communicate the first band signal and the second band signal through the first antenna, the second antenna, and the third antenna, to implement a 4G low-frequency and Global Positioning System (GPS) L5 dual connectivity or a partial-band 5G low-frequency and GPS L5 dual connectivity. The first band signal includes a first transmission signal, a first primary reception signal, and a first diversity reception signal. The second band signal includes a second transmission signal, a second primary reception signal, and a second diversity reception signal.

BRIEF DESCRIPTION OF THE DRAWINGS

FIG. 11 is a schematic diagram of signal communication of antennas in different combinations according to some embodiments of the present disclosure.

Figure 1:
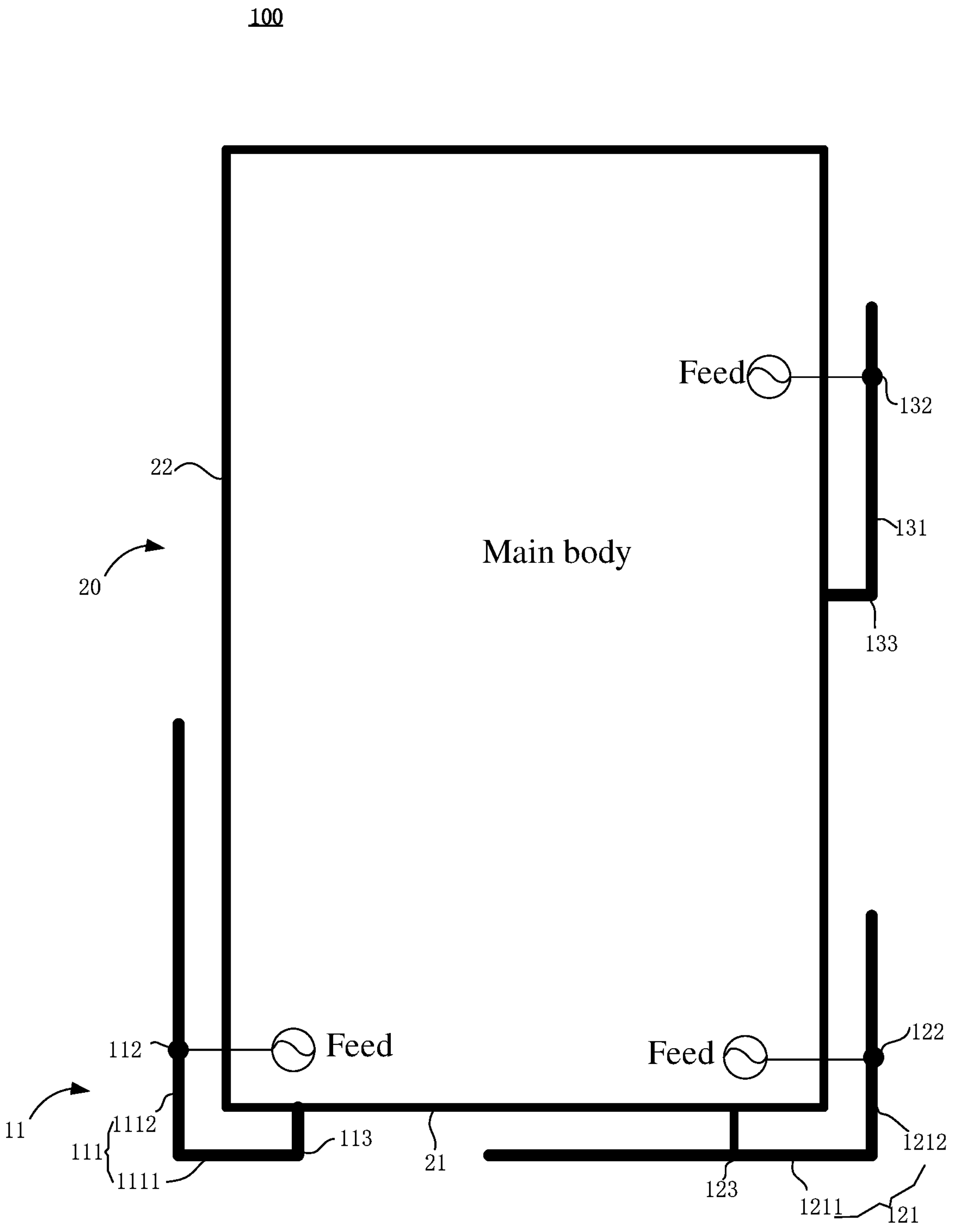
FIG. 1 is a schematic structural diagram of an antenna arrangement according to some embodiments of the disclosure.

Description of reference numerals of main components: mobile terminal 100, first antenna 11, first radiator 111, first branch 1111, second branch 1112, first feed point 112, first ground point 113, second antenna 12, second radiator 121, third branch 1211, fourth branch 1212, second feed point 122, second ground point 123, third antenna 13, third radiator 131, third feed point 132, third ground point 133, switch module 14; main body 20, short edge 21, first short edge 211, second short edge 212, side edge 22, first side edge 221, second side edge 222.

DETAILED DESCRIPTION

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

In the description of the present disclosure, it should be understood that terms “first” and “second” are only used for descriptive purposes, and cannot be understood as indicating or implying relative importance or implicitly indicating the number of indicated technical features. Therefore, the features associated with “first” and “second” may explicitly or implicitly include one or more of the features. In the description of the present disclosure, “plurality” means at least two, unless otherwise specifically defined.

In the description of the present disclosure, it should be noted that, unless otherwise clearly specified and limited, terms such as “install”, “connect”, “connect to” should be understood in a broad sense. For example, it may be a fixed connection or a detachable connection or connection as one piece; mechanical connection or electrical connection or mutual communication; direct connection or indirect connection through an intermediate; internal communication of two components or the interaction relationship between two components. For those of ordinary skill in the art, the specific meaning of the above-mentioned terms in the present disclosure can be understood according to specific circumstances.

Various embodiments or examples for implementing different structures of the present disclosure are provided below. In order to simplify the description of the present disclosure, components and arrangements of specific examples are described herein. These specific examples are merely for the purpose of illustration, rather than limiting the present disclosure. Further, the same reference numerals and/or reference letters may appear in different examples of the present disclosure for the purpose of simplicity and clarity, instead of indicating a relationship between different embodiments and/or arrangements in discussion.

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

Non-Standalone (NSA) and Standalone (SA) are two communication modes adopted by a 5G system. Due to high costs of the Standalone mode, mobile terminals such as cell phones currently mainly use the Non-Standalone mode to save costs.

Currently, in the Non-Standalone mode, a mobile terminal can implement a 4G-LTE and 5G-NR Double Connect (LTE NR Double Connect, EN-DC). Since a distance that an electromagnetic wave propagates in the space increases as a frequency of the electromagnetic wave decreases, in the EN-DC mode, a Lower Band (LB) are adopted by 4G-LTE and 5G-NR. LB refers to a band within which a frequency is lower than 1,000 MHz. Bands of 4G-LTE may include B5, B8, B20, B28, etc., while bands of 5G-NR may include N5, N8, N20, N28, etc.

In the related art, a plurality of antennas may be set up in the mobile terminal to implement the ENDC. However, due to limitations of an accommodation space of the mobile terminal and an influence of electromagnetic radiation of antennas, a range of bands supported by the antenna is limited, in such a manner that the mobile terminal can only support specific bands in the ENDC mode. For example, the mobile terminal can only support B20+N28 in the ENDC mode. B20 is a band supported by LTE. An uplink band of B20 ranges from 832 MHz to 862 MHz, while a downlink band of B20 ranges from 791 MHz to 821 MHz. N28 is a band supported by NR. An uplink band of N28 ranges from 703 MHz to 748 MHz, while a downlink band of N28 ranges from 758 MHz to 803 MHz. Therefore, it is impossible for the mobile terminal to implement a full-band (a band within which frequencies range from 700 MHz to 960 MHz) L+L (LTE low-frequency+NR low-frequency dual connectivity) ENDC mode, e.g., B20+N28, B20+N8, B28+N5. Therefore, for the mobile terminal, there is an urgent need for L+L communication that can cover the full band.

In view of this and with reference to FIG. 1, an embodiment of the present disclosure provides a mobile terminal 100. The mobile terminal 100 can implement a full-band 4G LTE low-frequency and 5G NR low-frequency dual connectivity or a full-band low-frequency carrier aggregation. The mobile terminal 100 can further implement a partial-band 4G low-frequency and GPS L5 dual connectivity or a partial-band 5G low-frequency and GPS L5 dual connectivity.

The mobile terminal 100 may be a cell phone, a tablet computer, etc. In the present disclosure, the mobile terminal 100 is described as a cell phone. That is, the mobile terminal 100 is not limited to the cell phone.

The mobile terminal 100 includes a main body 20. The main body 20 is in a rectangular shape, and includes a side edge 22 and a short edge 21. A length of the side edge 22 is longer than a length of the short edge 21. Each of the short edge 21 and the side edge 22 may be made of a metallic material, and is not limited to the example.

The mobile terminal 100 further includes an antenna device. The antenna device includes a first antenna 11, a second antenna 12, and a third antenna 13. The first antenna 11 is located at the short edge 21 and the side edge 22 adjacent to the short edge 21. The first antenna 11 includes a first radiator 111, a first feed point 112, and a first ground point 113. The first radiator 111 includes a first branch 1111 and a second branch 1112 that are connected to each other. The second branch 1112 bends and extends from an end of the first branch 1111. The first branch 1111 is shorter than the second branch 1112 and is located at the short edge 21. The second branch 1112 is located at the side edge 22.

The first antenna 11 may support receiving and/or transmitting two kinds of band signals simultaneously, while each of the second antenna 12 and the third antenna 13 supports receiving and/or transmitting only one kind of band signals at a same time point. For example, in the B20+N28 mode, the first antenna 11 may support both reception and transmission of signals in B20 and reception and transmission of signals in N28, while each of the second antenna 12 and the third antenna 13 supports reception and transmission of signals in B20 only or reception and transmission of signals in N28 only.

A bandwidth supported by the first antenna 11 is greater than a bandwidth supported by the second antenna 12 or the third antenna 13. For example, the bandwidth supported by the first antenna 11 may be 300 MHz, while the bandwidth supported by each of the second antenna 12 and the third antenna 13 is 100 MHz. An operation frequency of the first antenna 11 covers an operation frequency of each of the second antenna 12 and the third antenna 13.

The antenna device can be configured to implement a full-band 4G low-frequency and 5G low-frequency dual connectivity through the first antenna 11, the second antenna 12, and the third antenna 13. Or, the antenna device can be configured to implement a full-band low-frequency carrier aggregation through the first antenna 11, the second antenna 12, and the third antenna 13. Or, the antenna device can be configured to implement a partial-band 4G low-frequency and GPS L5 dual connectivity or a partial-band 5G low-frequency and GPS L5 dual connectivity through the first antenna 11, the second antenna 12, and the third antenna 13.

In the mobile terminal 100 of the embodiments of the present disclosure, the first antenna 11 is disposed at the side edge 22 and the short edge 21 adjacent to the side edge 22. The first branch 1111 is disposed at the short edge 21. The second branch 1112 is disposed at the side edge 22. The first ground point 113 is disposed at the short edge 21. The first antenna 11 is capable of covering any band of the 4G and the 5G within the lower band range or is capable of covering partial bands of the 4G and the 5G within the lower band range and a GPS L5 band. In this way, the mobile terminal 10 can be configured to implement the full-band 4G low-frequency and 5G low-frequency dual connectivity or a full-band low-frequency carrier aggregation connection through the first antenna 11, the second antenna 12, and the third antenna 13. Or, the mobile terminal 10 can be configured to implement the partial-band 4G low-frequency and GPS L5 dual connectivity or the partial-band 5G low-frequency and GPS L5 dual connectivity through the first antenna 11, the second antenna 12, and the third antenna 13.

There is no limitation on a material used by each of the first antenna 11, the second antenna 12, and the third antenna 13. The material may be, for example, a Polyimide (PI) film, a Liquid Crystal Polymer (LCP), a Modified Polyimide (MPI), or the like.

It should be noted that the full-band 4G LTE low-frequency and 5G NR low-frequency dual connectivity refers to that, when the EN-DC (E-UTRA and New radio Dual Connectivity, which is a dual connectivity of 4G LTE and 5G NR) mode is adopted in the Non-Standalone mode, a band that can be adopted by 4G LTE may be any band in the LB, and a band that can be adopted by 5G NR is any band in the LB, and the band adopted by 4G LTE is different from that adopted by 5G NR.

Figure 2:
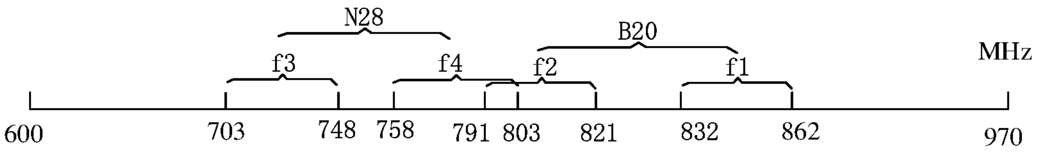
FIG. 2 is a schematic diagram of a lower band range according to some embodiments of the present disclosure.

With reference to FIG. 2, in the ENDC mode of the present disclosure, frequencies of bands supported by 4G LTE and 5G NR may range from 600 MHz to 970 MHz. That is, the band adopted by 4G LTE or the band adopted by 5G NR may be any band within the frequency range from 600 MHz to 970 MHz. For example, 4G LTE adopts the band B20 with an uplink band range f1 of 832 MHz to 862 MHz and a downlink band range f2 of 791 MHz to 821 MHz. 5G NR adopts the band N28 with an uplink band range f3 of 703 MHz to 748 MHz and a downlink band range f4 of 758 MHz to 803 MHz. It should be understood that, since frequencies of a band currently used range from 700 MHz to 960 MHz when 4G LTE or 5G NR communicates through low frequencies, and frequencies covered in the present disclosure range from 600 MHz to 970 MHz, the full-band 4G low-frequency and 5G low-frequency dual connectivity may be realized.

The carrier aggregation means that a band used by an LTE-Advanced (LTE-A) system is a bandwidth formed by an aggregation of two or more LTE Component Carriers (CCs) in compliance with relevant technical specifications of LTE-A. It should be understood that the low-frequency carrier aggregation means that a band supported by the carrier aggregation is a low-frequency band. That is, the band supported by the low-frequency carrier aggregation ranges from 600 MHz to 970 MHz. The low-frequency carrier aggregation may include a 4G low-frequency carrier aggregation and a 5G low-frequency carrier aggregation.

GPS L5 is a civil GPS signal that facilitates a cycle-slip detection, a correction of an ionospheric delay error, and a determination of ambiguity of whole cycles during a GPS measurement, and can improve a civil positioning accuracy from 5 m to 30 cm. A band of GPS L5 ranges from 1,176.45 MHz+1.023 MHz to 1,176.45 MHz−1.023 MHz.

In some embodiments, the short edge 21 includes a first short edge 211 and a second short edge 212. The side edge 22 includes a first side edge 221 and a second side edge 222. The first short edge 211 is opposite to the second short edge 212. The first side edge 221 is opposite to the second side edge 222.

The first antenna 11 is located at any short edge 21 and the side edge 22 adjacent to the short edge 21. With reference to FIG. 1, in the present disclosure, the first antenna 11 may be located at the first short edge 211 and the first side edge 221. Of course, it should be understood that in some other embodiments, the first antenna 11 may be disposed at the first short edge 211 and the second side edge 222, or at the second short edge 212 and the first side edge 221. That is, there is no limitation on a specific position of the first antenna 11.

Further, the first antenna 11 includes the first radiator 111, the first feed point 112, and the first ground point 113. The first radiator 111 includes the first branch 1111 and the second branch 1112. The first branch 1111 is located at the first short edge 211. The second branch 1112 is located at the first side edge 221. A length of the first branch 1111 is smaller than a length of the second branch 1112. The first feed point 112 is located at the second branch 1112. The first feed point 112 is connected to a feed. The first ground point 113 is located at an end of the first branch 1111 and grounded.

Figure 3:
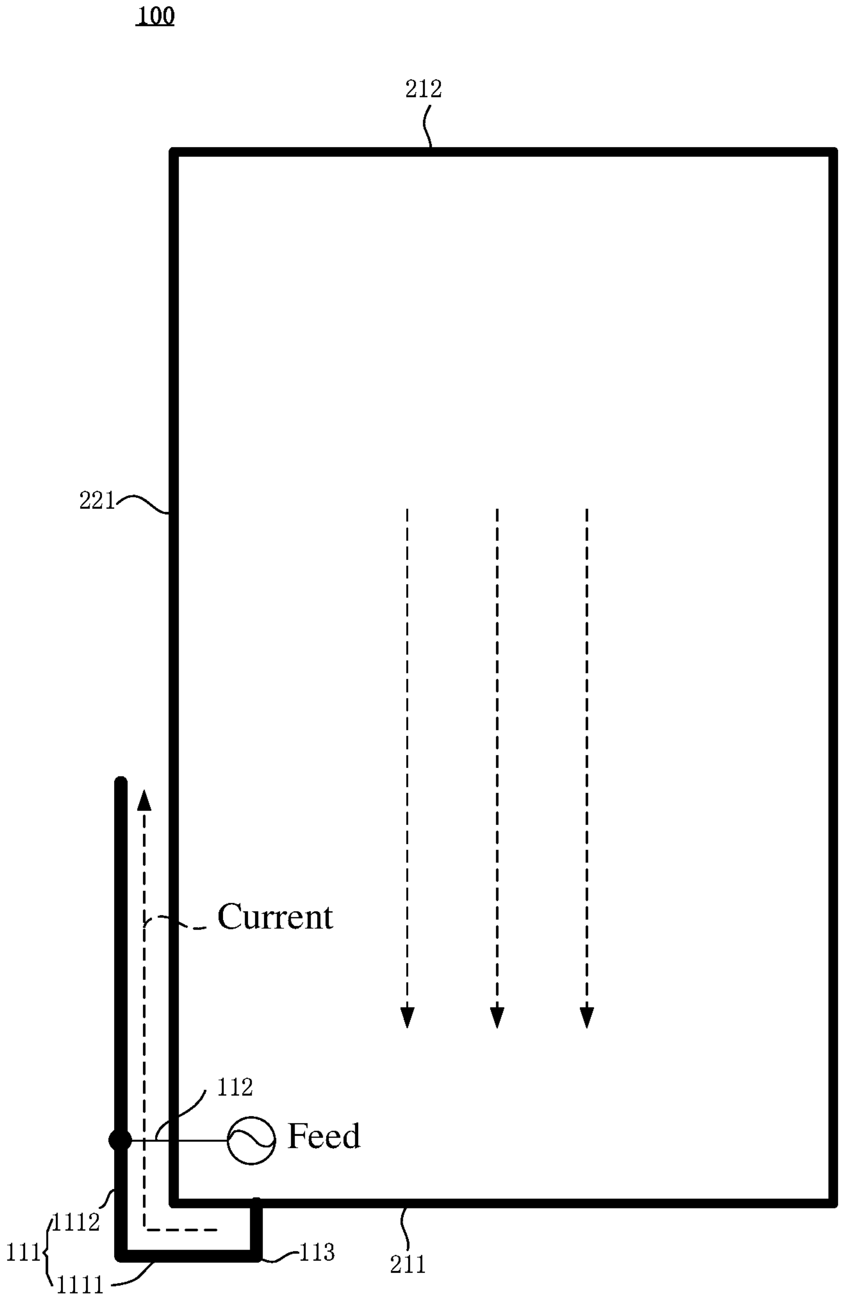
FIG. 3 and FIG. 4 each are a schematic diagram of an operation of a first antenna according to some embodiments of the present disclosure.
Figure 4:
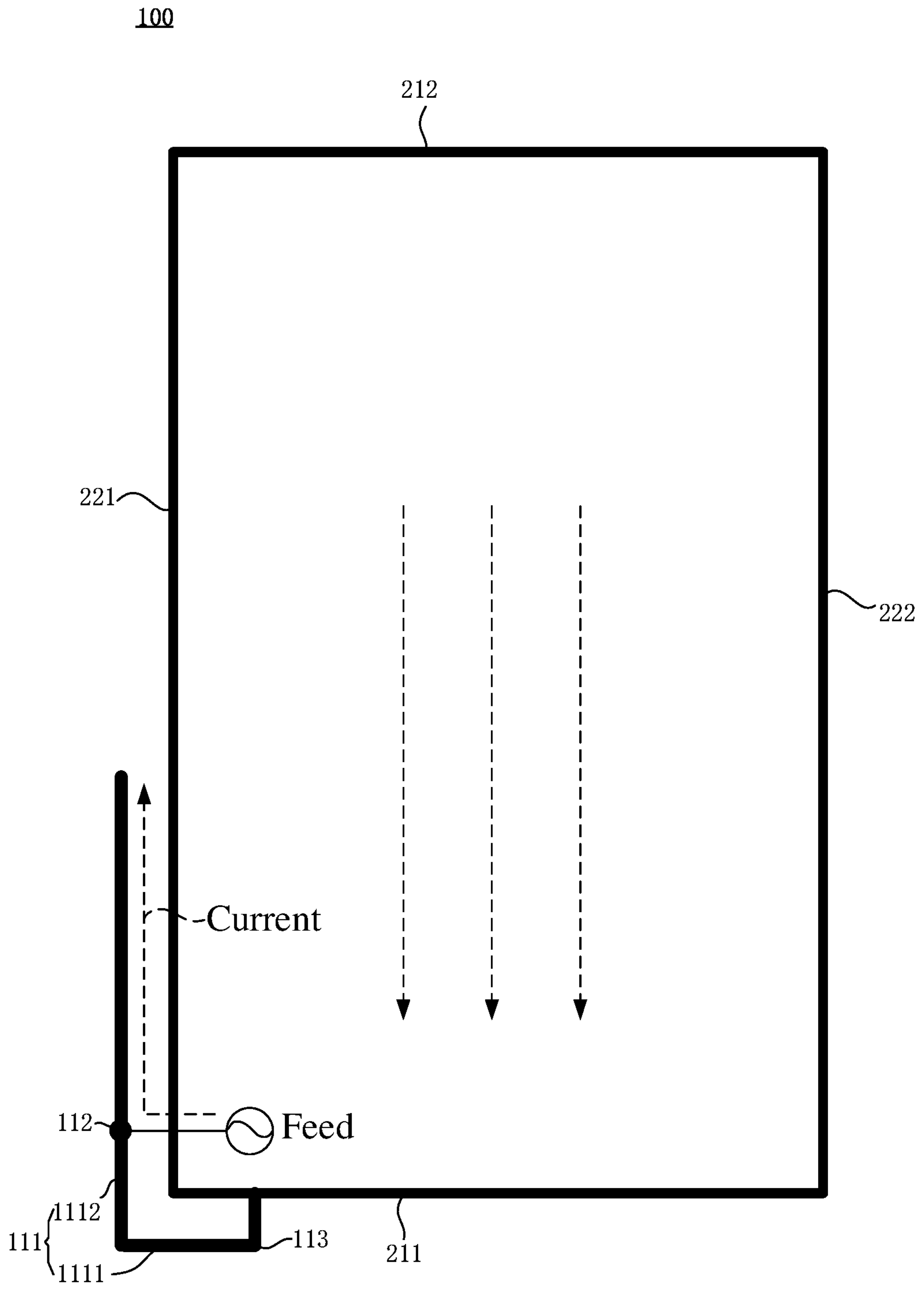

With reference to FIG. 3 and FIG. 4, the first antenna 11 includes a first operation mode and a second operation mode. The first antenna 11 covers a bandwidth greater than 190 MHz by using the first operation mode and the second operation mode together. In the first operation mode, a current in the first antenna 11 flows from the first ground point 113 to the first branch 1111 and the second branch 1112. In the second operation mode, a current in the first antenna 11 flows from the first feed point 112 to a free end of the second branch 1112.

A total length of the first branch 1111 and the second branch 1112 is about a quarter of a wavelength corresponding to a central frequency of the first operation mode. A length from the first feed point 112 to an end of the free end of the second branch 1112 is about a quarter of the wavelength corresponding to a central frequency of the second operation mode.

Further, the first antenna 11 is configured to adjust frequency coverage of the first antenna 11 by adjusting a central operation frequency of the first operation mode and a central operation frequency of the second operation mode, to allow the first antenna 11 to support all of the bands adopted by 4G-LTE and 5G-NR in the lower band range, or to allow the first antenna 11 to support a portion of the bands adopted by 4G-LTE and 5G-NR in the lower band range and the band of GPS L5.

Figure 5:
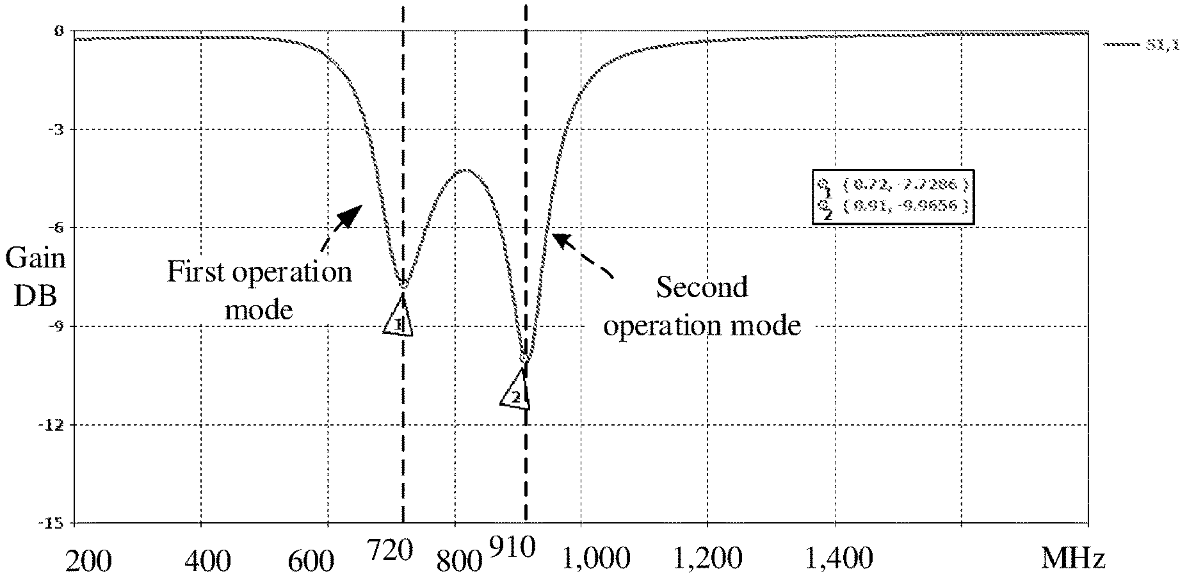
FIG. 5 is a schematic diagram of a return loss of a first antenna at different frequencies according to some embodiments of the present disclosure.

For example, in some embodiments, the first antenna 11 is configured to enable a frequency range covered by the first antenna 11 from 600 MHz to 970 MHz by adjusting the central frequency of the first operation mode and the central frequency of the second operation mode. FIG. 5 is a schematic diagram of a return loss of the first antenna 11 at different frequencies. With reference to FIG. 5, since the first antenna 11 has a smallest return loss at each of two operation frequencies, 720 MHz and 910 MHz, among frequencies ranging from 600 MHz to 970 MHz, the central frequency supported by the first operation mode may be about 720 MHz, and the central frequency supported by the second operation mode may be about 910 MHz. In this way, the first antenna 11 can support a frequency range from 600 MHz on the left side of the central frequency of the first operation mode to 970 MHz on the right side of the central frequency of the second operation mode.

Further, the length from the first feed point 112 to the end of the free end is a quarter of a wavelength of a signal at a frequency of 910 MHz. The total length of the first branch 1111 and the second branch 1112 is a quarter of the wavelength corresponding to the signal at the frequency of 910 MHz. It should be understood by those skilled in the art that an antenna has a highest transmission and reception conversion efficiency when the length of the antenna is a quarter of a wavelength of a radio signal. In this way, with settings of the length of the first branch 1111 and the length of the second branch 1112, the first antenna 11 can have a high efficiency in both the first operation mode and the second operation mode to implement ultra-wide band coverage, in such a manner that all the bands adopted by 4G-LTE and 5G-NR in the lower band range can be covered simultaneously, enabling the mobile terminal 100 to implement the full-band 4G-LTE low-frequency and 5G-NR low-frequency dual connectivity, or enabling the mobile terminal 100 to implement the full-band low-frequency carrier aggregation.

For example, in some other embodiments, the first antenna 11 can be configured to cover a portion of 4G and 5G low-frequency bands and the GPS L5 band simultaneously by adjusting the central frequency of the first operation mode and the central frequency of the second operation mode. The central frequency supported by the first operation mode is around 720 MHz. The central frequency supported by the second operation mode is around 1,176 MHz. The first antenna 11 covers a portion of the low-frequency bands adopted by 4G-LTE and 5G-NR through the first operation mode and covers the GPS-L5 band through the second operation mode.

In this embodiment, the first antenna 11 may be the same as or different from the first antenna 11 of any of the above embodiments. For example, the total length of the first branch 1111 and the second branch 1112 is a quarter of the wavelength corresponding to the central frequency of the first operation mode, and the length from the first feed point 122 to the end of the free end is a quarter of a wavelength of a signal at the central frequency of the second operation mode. In this way, the first antenna 11 implements the ultra-wide band coverage in the first operation mode and the second operation mode.

Figure 6:
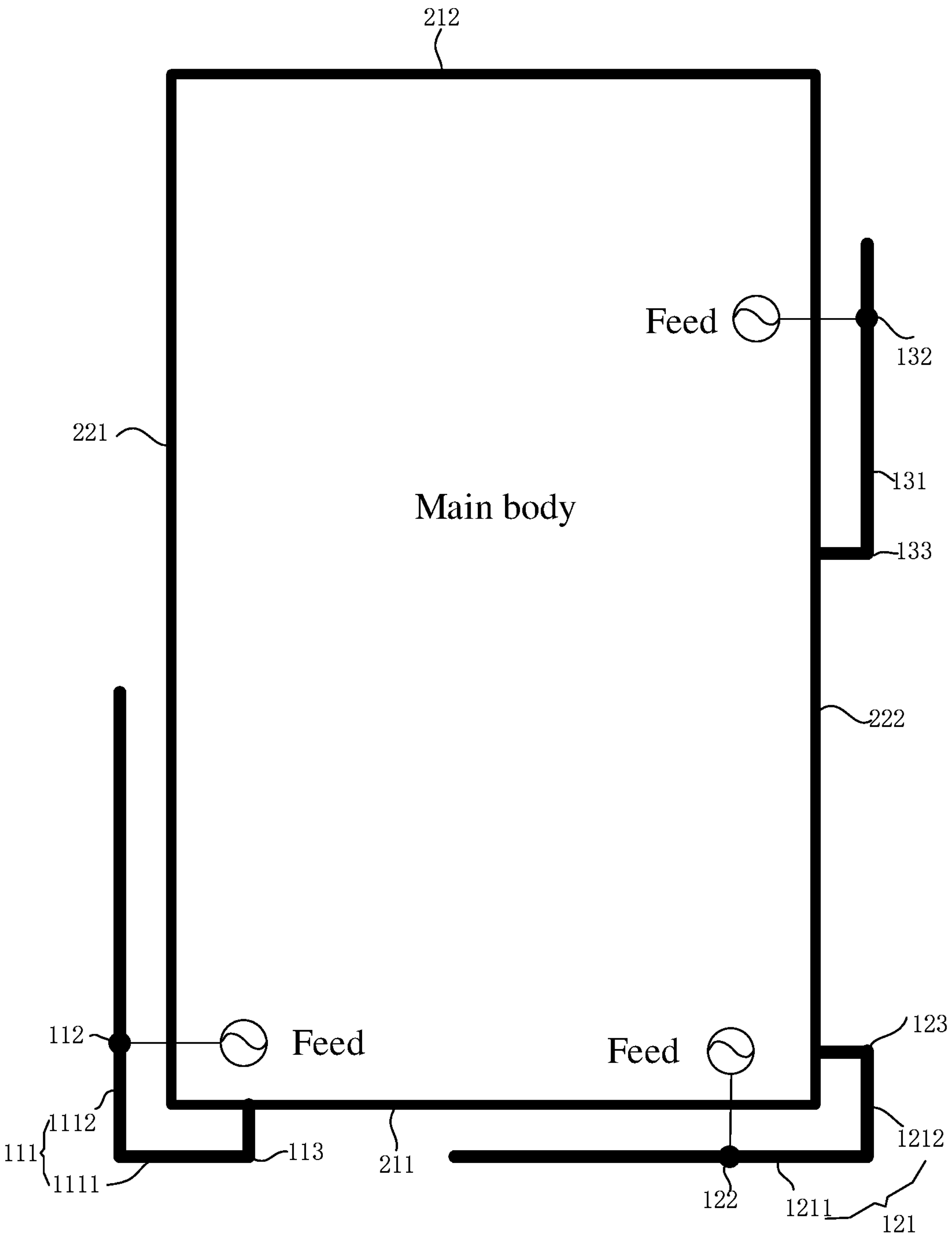
FIG. 6 and FIG. 7 each are a schematic structural diagram of an antenna arrangement according to some embodiments of the present disclosure.
Figure 7:
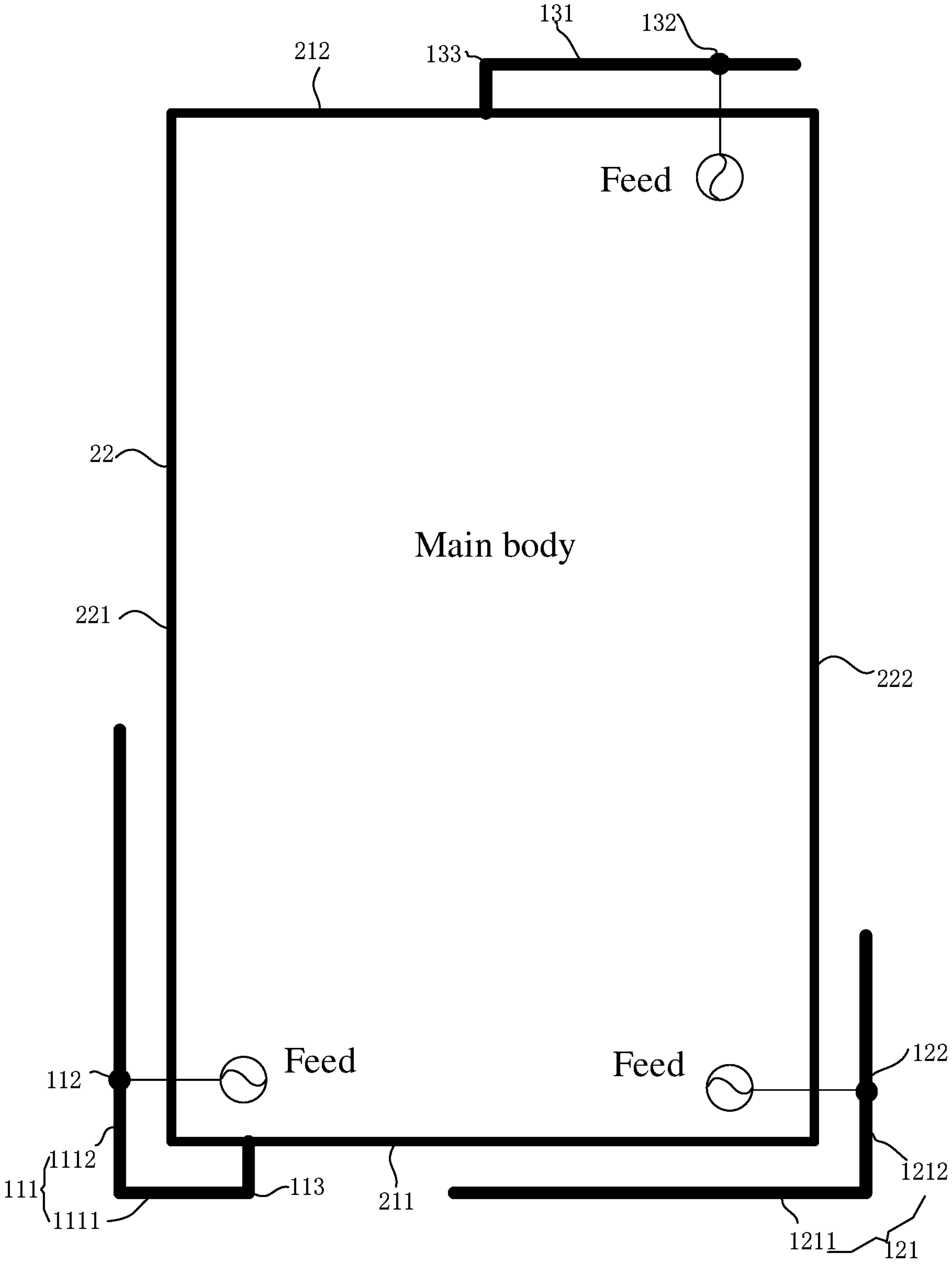

With reference to FIG. 1, FIG. 6, and FIG. 7, the second antenna 12 is spaced apart from the first antenna 11 and includes a second radiator 121, a second feed point 122, and a second ground point 123. The second ground point 123 is located at an end portion of an end of the second radiator 121 or between two ends of the second radiator 121 and is grounded. The second feed point 122 is located between two ends of the second radiator 121 and connected to a feed.

The third antenna 13 is spaced apart from the first antenna 11 and the second antenna 12. The third antenna 13 includes a third radiator 131, a third feed point 132, and a third ground point 133. The third ground point 133 is located between two ends of the third radiator 131 or at an end portion of an end of the third radiator 131 and is grounded. The third feed point 122 is located between two ends of the third radiator 131 and connected to a feed.

With further reference to FIG. 1, in some embodiments, the second antenna 12 is located at the short edge 21 and the side edge 22 adjacent to the short edge 21. The third antenna 13 is located at the side edge 22 on a same side as the second antenna 12 and spaced apart from the second antenna 12.

In some embodiments, the second radiator 121 includes a third branch 1211 and a fourth branch 1212 that are connected to each other. The third branch 1211 is located at the first short edge 211. The fourth branch 1212 is located at the second side edge 222. The second feed point 122 is located at the fourth branch 1212 and connected to a feed located within the main body 20. The second ground point 123 is located between two ends of the third branch 1211 and connected to the short edge 21 to be grounded. The third feed point 132 is located between two ends of the third radiator 131 and connected to a feed in the main body 20. The third ground point 133 is located at an end portion of the third radiator 131 and connected to the side edge 22 to be grounded.

It should be understood that an antenna generates electromagnetic radiation by means of a radiator. Also, an intensity of the electromagnetic radiation grows as a bandwidth of the antenna increases. The first radiator 111 of the first antenna 11 is mainly at the first side edge 221. The second radiator 121 of the second antenna 12 is mainly at a region where the first short edge 211 and the second side edge 222 are connected to each other. The third radiator 131 of the third antenna 13 is at a side of the second side edge 222 close to the second short edge 212. With such an arrangement of the first antenna 11, the second antenna 12, and the third antenna 13 in FIG. 1, electromagnetic radiation generated by the first radiator 111 is mainly in a region of the first side edge 221, electromagnetic radiation generated by the second radiator 121 is mainly in a region between the first short edge 211 and the second side edge 222, and electromagnetic radiation generated by the third radiator 131 is mainly at the side of the second side edge 222 close to the second short edge 212. Therefore, high isolation can be achieved between the first antenna 11, the second antenna 12, and the third antenna 13, reducing interference between electromagnetic waves generated by individual antennas.

With further reference to FIG. 6, in some embodiments, the second antenna 12 is located at the short edge 21 and the side edge 22 adjacent to the short edge 21. The third antenna 13 is located at the side edge 22 on the same side as the second antenna 12 and spaced apart from the second antenna 12.

In some embodiments, the second radiator 121 includes the third branch 1211 and the fourth branch 1212 that are connected to each other. The third branch 1211 is located at the first short edge 211. The fourth branch 1212 is located at the second side edge 222. The second feed point 122 is located at the third branch 1211 and connected to the feed located within the main body 20. The second ground point 123 is located at an end portion of the fourth branch 1212 and connected to the second side edge 222 to be grounded. The third feed point 132 is located between the two ends of the third radiator 131 and connected to the feed in the main body 20. The third ground point 133 is located at the end portion of the third radiator 131 and connected to the second side edge 222 to be grounded.

With further reference to FIG. 7, in some embodiments, the second antenna 12 is located at the first short edge 211 and the second side edge 222 adjacent to the first short edge 211. The third antenna 13 is located at the second short edge 212.

In some embodiments, the second radiator 121 includes the third branch 1211 and the fourth branch 1212 that are connected to each other. The third branch 1211 is located at the first short edge 211. The fourth branch 1212 is located at the second side edge 222. The second feed point 122 is located at the fourth branch 1212 and connected to the feed located within the main body 20. The second ground point 123 is located between the two ends of the third branch 1211 and connected to the short edge 21 to be grounded. The third feed point 132 is located between the two ends of the third radiator 131 and connected to the feed located within the main body 20. The third ground point 133 is located at the end portion of the third radiator 131 and connected to the second short edge 212 to be grounded.

It should be understood that, compared with the above-mentioned arrangement of disposing the third antenna 13 at the side edge 22 on the same side as the second antenna 12, the arrangement of disposing the third antenna 13 at the short edge 21 facing away from the first antenna 11 enables the third antenna 13 to further face away from the first antenna 11 and the second antenna 12, which further increases the isolation between the first antenna 11, the second antenna 12, and the third antenna 13, further reducing the interference between the electromagnetic waves generated by the antennas.

It should be noted that the description of the above embodiments describes only examples of distribution positions of portions of the first antenna 11, the second antenna 12, and the third antenna 13. The distribution positions of the portions of the first antenna 11, the second antenna 12, and the third antenna 13 are not limited to the above embodiments. For example, in some other embodiments, the second antenna 12 may be disposed entirely at the second side edge 222, and the third antenna 13 is disposed at the second short edge 212.

The antenna device is configured to communicate a first band signal and a second band signal through the first antenna 11, the second antenna 12, and the third antenna 13, to implement a full-band 4G low-frequency and 5G low-frequency dual connectivity or a full-band low-frequency carrier aggregation. Or, the antenna device 10 is configured to communicate the first band signal and the second band signal through the first antenna 11, the second antenna 12, and the third antenna 13, to implement a partial-band 4G low-frequency and GPS L5 dual connectivity or a partial-band 5G low-frequency and GPS L5 dual connectivity. A frequency of the first band signal is within a range of a first band. A frequency of the second band signal is within a range of a second band. The first band and the second band belong to different bands. For example, the first band is B20 and the second band is B28.

In some embodiments, the first band signal is a 4G band signal, and the second band signal is a 5G band signal. The antenna device is configured to implement 4G and 5G dual-connectivity communication of the 4G first band and the 5G second band.

In some embodiments, the first band signal is a 5G band signal, and the second band signal is a 4G band signal. The antenna device is configured to implement 4G and 5G dual-connectivity communication of the 5G first band and the 4G second band.

In some embodiments, both the first band signal and the second band signal are 4G band signals. The antenna device is configured to implement a carrier aggregation of the 4G first band and the 4G second band.

In some embodiments, both the first band signal and the second band signal are 5G band signals. The antenna device is configured to implement a carrier aggregation of the 5G first band and the 5G second band.

In some embodiments, the first band signal is a 4G band signal, and the second band signal is a GPS-L5 band signal. The antenna device is configured to implement a 4G and GPS-L5 dual connectivity of the 4G first band and a GPS-L5 band.

In some embodiments, the first band signal is a 5G band signal, and the second band signal is a GPS-L5 band signal. The antenna device is configured to implement a 5G and GPS-L5 dual connectivity of the 5G first band and the GPS-L5 band.

In some embodiments, the first band signal is a GPS-L5 band signal, and the second band signal is a 4G band signal. The antenna device is configured to implement a 4G and GPS-L5 dual connectivity of the 4G second band and the GPS-L5 band.

In some embodiments, the first band signal is a GPS-L5 band signal, and the second band signal is a 5G band signal. The antenna device is configured to implement a 5G and GPS-L5 dual connectivity of the 5G second band and the GPS-L5 band.

Further, the first band signal includes a first transmission signal, a first primary reception signal, and a first diversity reception signal. The second band signal includes a second transmission signal, a second primary reception signal, and a second diversity reception signal. The first primary reception signal is an uplink signal under the first band signal. The first diversity reception signal is a downlink signal under the first band signal. The second primary reception signal is an uplink signal under the second band signal. The second diversity reception signal is a downlink signal under the second band signal. The first transmission signal is a transmission signal of the first band signal. The second transmission signal is a transmission signal of the second band signal.

The first antenna 11 can be configured to communicate any reception signal in two operation bands simultaneously. Each of the second antenna 12 and the third antenna 13 can be configured to communicate only one reception signal in one operation band. The first transmission signal is transmitted by any antenna configured to receive the first primary reception signal or the first diversity reception signal. The second transmission signal is transmitted by any antenna configured to receive the second primary reception signal or the second diversity reception signal. The antenna configured to transmit the first transmission signal is different from the antenna configured to transmit the second transmission signal.

For example, when the first antenna 11 is configured to receive the first primary reception signal and the second diversity reception signal, the second antenna 12 is configured to receive the first diversity reception signal, and the third antenna 13 is configured to receive the second primary reception signal, the first antenna 11 is further configured to transmit the first transmission signal, and the third antenna 13 is further configured to transmit the second transmission signal. For example, when the first antenna 11 is configured to receive the first primary reception signal and the second diversity reception signal, the second antenna 12 is configured to receive the first diversity reception signal, and the third antenna 13 is configured to receive the second primary reception signal, the first antenna 11 is further configured to transmit the second transmission signal, and the second antenna 13 is further configured to transmit the second transmission signal.

Figure 8:
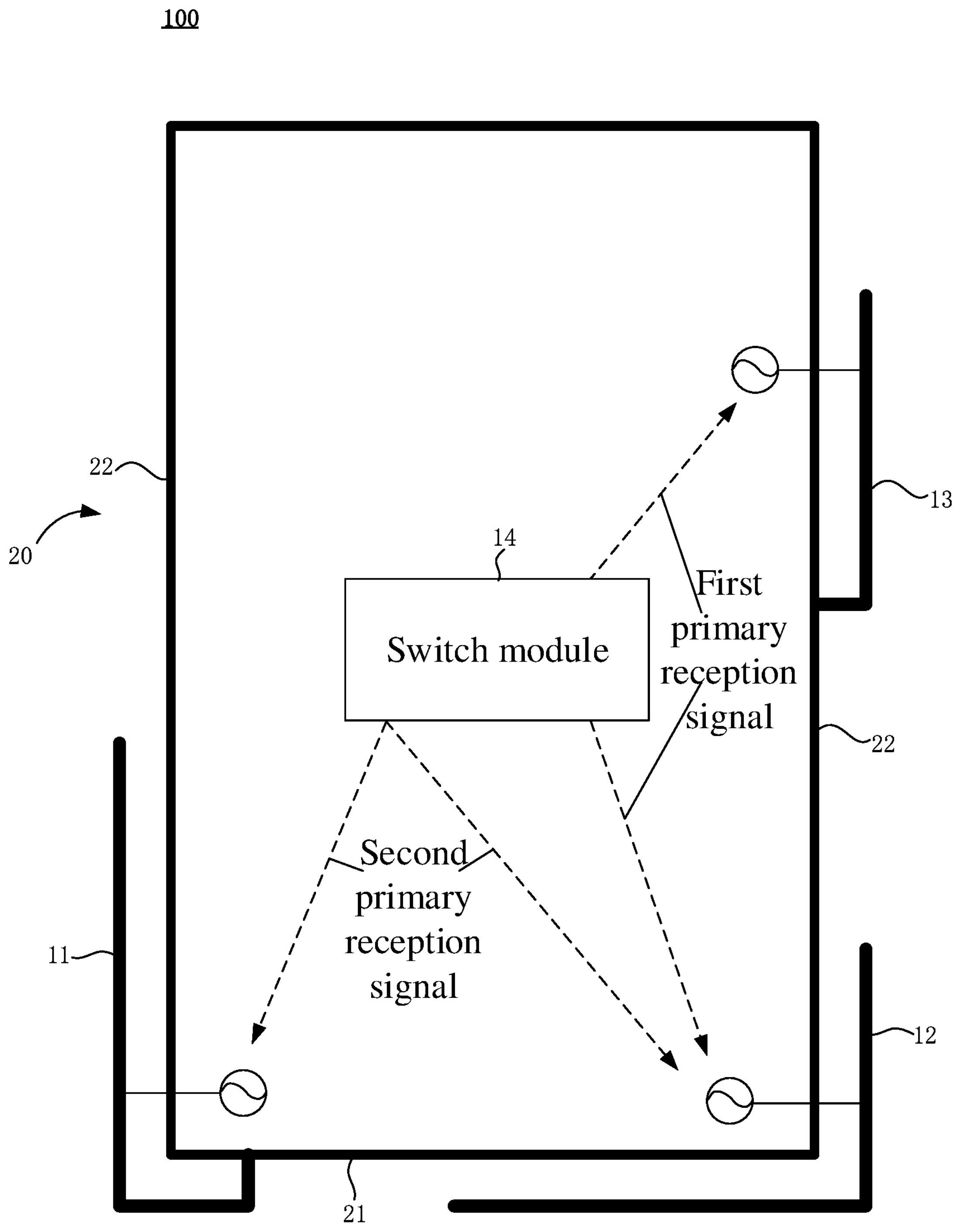
FIG. 8 to FIG. 10 each are a schematic diagram of switching of a switch module according to some embodiments of the present disclosure.
Figure 9:
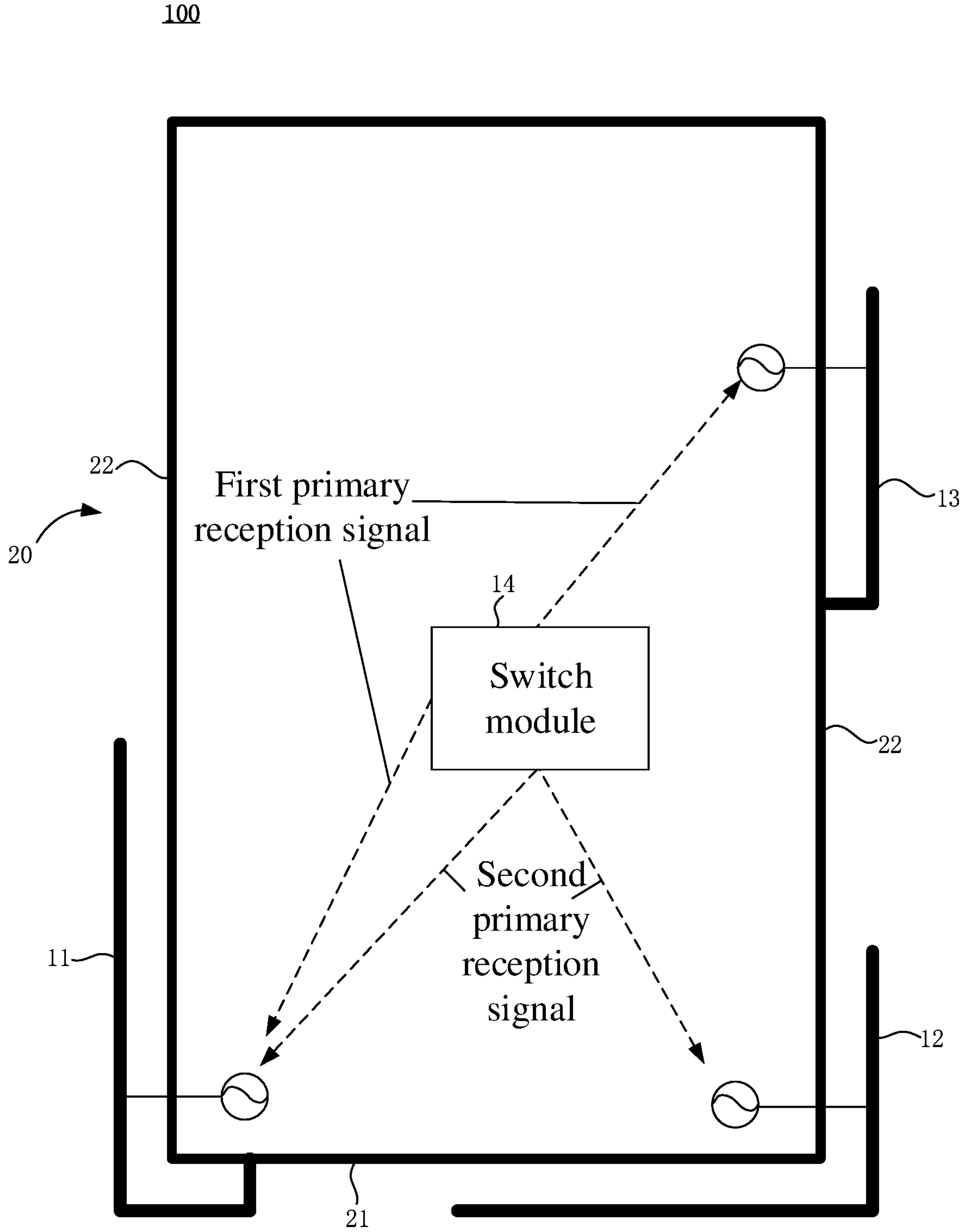
Figure 10:
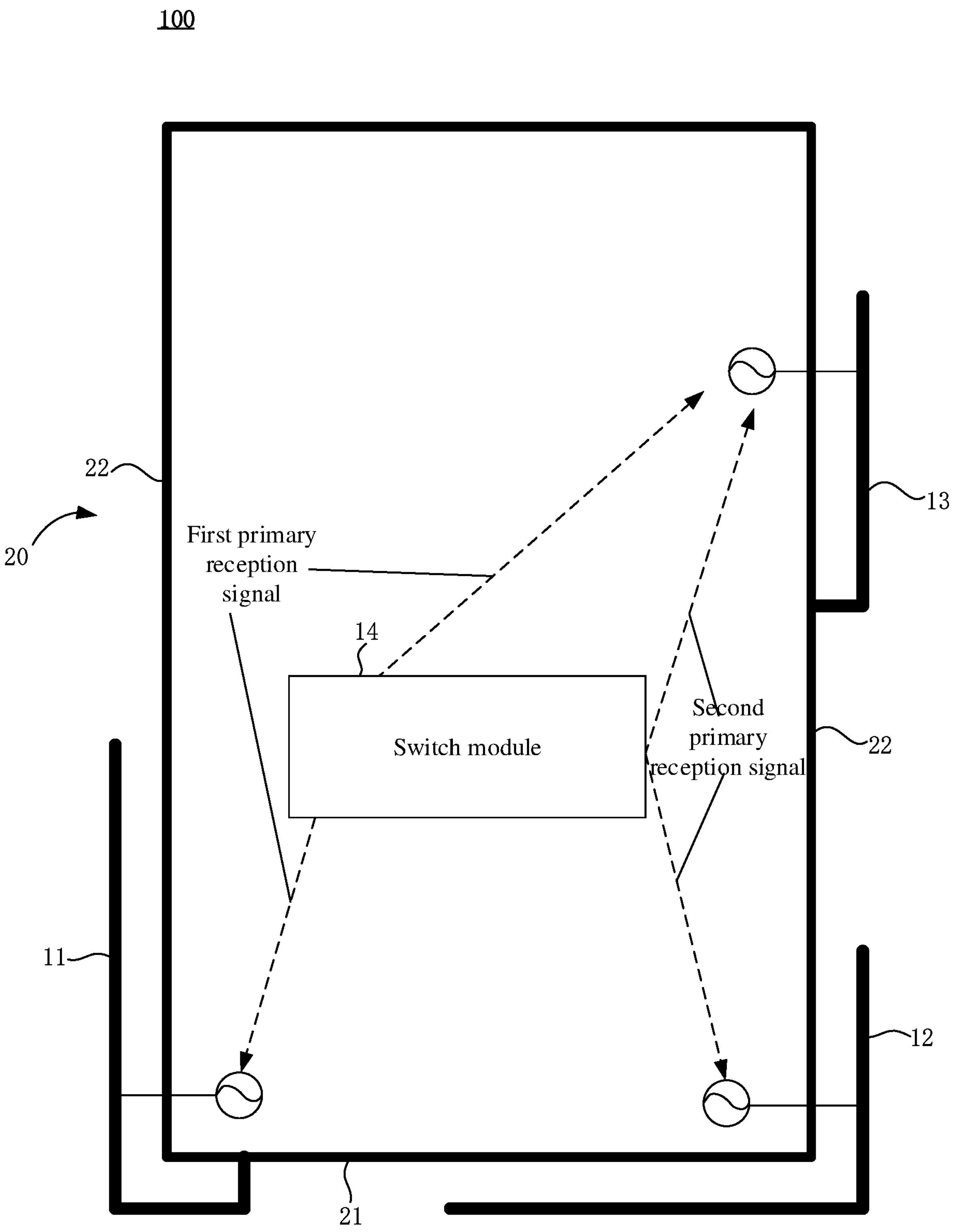

With reference to FIG. 8, FIG. 9, and FIG. 10, the mobile terminal 100 further includes a switch module 14. The switch module 14 is configured to control transmission of the first primary reception signal and transmission of the second primary reception signal. The switch module 14 can be configured to determine, based on signal strength of each of the first antenna 11, the second antenna 12, and the third antenna 13, antennas that receive the first primary reception signal and the second primary reception signal. For example, when the signal strength of the first antenna 11 and the signal strength of the second antenna 12 are greater than the signal strength of the third antenna 13, the first primary reception signal and the second primary reception signal are received by the first antenna 11 and the second antenna 12, respectively. When the signal strength of the first antenna 11 and the signal strength of the third antenna 13 are greater than the signal strength of the second antenna 12, the first primary reception signal and the second primary reception signal are received by the first antenna 11 and the third antenna 13, respectively.

With further reference to FIG. 8 and FIG. 11, in some embodiments, the first antenna 11 can be configured to communicate the first diversity reception signal and the second diversity reception signal, the second antenna 12 can be configured to communicate the second primary reception signal, and the third antenna 13 can be configured to communicate the first primary reception signal; or, the first antenna 11 can be configured to communicate the first diversity reception signal and the second primary reception signal, the second antenna 12 can be configured to communicate the first primary reception signal, and the third antenna 13 can be configured to communicate the second diversity reception signal.

In some embodiments, the switch module 14 can be configured to compare the signal strength of the second antenna 12 with the signal strength of the third antenna 13, and control, based on a magnitude of the signal strength of the second antenna 12 and a magnitude of the signal strength of the third antenna 13, the first primary reception signal to be communicated by the second antenna 12 or by the third antenna 13. The switch module 14 can further be configured to compare the signal strength of the first antenna 11 with the signal strength of the second antenna 12, and control, based on a magnitude of the signal strength of the first antenna 11 and the magnitude of the signal strength of the second antenna 12, the second primary reception signal to be communicated by the first antenna 11 or by the second antenna 12.

In the default state, the switch module 14 can be configured to control the third antenna 13 to communicate the first primary reception signal and control the second antenna 12 to communicate the second primary reception signal. That is, in the default state, the third antenna 13 is configured to communicate the first primary reception signal, the second antenna 12 is configured to communicate the second primary signal, and the first antenna 11 is configured to communicate the first diversity reception signal and the second diversity reception signal.

When the switch module 14 switches the first primary reception signal to be communicated by the second antenna 12 and switches the second primary reception signal to be communicated by the first antenna 11, the first antenna 11 communicates the first diversity reception signal and the second primary reception signal, the second antenna 12 communicates the first primary reception signal, and the third antenna 13 communicates the second diversity reception signal.

With reference to FIG. 9 and FIG. 11, in some embodiments, the first antenna 11 can be configured to communicate the first diversity reception signal and the second diversity reception signal, the second antenna 12 can be configured to communicate the second primary reception signal, and the third antenna 13 can be configured to communicate the first primary reception signal; or, the first antenna 11 can be configured to communicate the first primary reception signal and the second diversity reception signal, the second antenna 12 can be configured to communicate the second primary reception signal, and the third antenna 13 can be configured to communicate the first diversity reception signal; or, the first antenna 11 can be configured to communicate the first diversity reception signal and the second primary reception signal, the second antenna 12 can be configured to communicate the second diversity reception signal, and the third antenna 13 can be configured to communicate the first primary reception signal.

In some embodiments, the switch module 14 can be configured to control the first primary reception signal to be communicated by the first antenna 11 or the third antenna 13. The switch module 14 can further be configured to control the second primary reception signal to be communicated by the first antenna 11 or the second antenna 12.

In the default state, the switch module 14 is configured to control the third antenna 13 to communicate the first primary reception signal and control the second antenna 12 to communicate the second primary reception signal. That is, in the default state, the third antenna 13 is configured to communicate the first primary reception signal, the second antenna 12 is configured to communicate the second primary signal, and the first antenna 11 is configured to communicate the first diversity reception signal and the second diversity reception signal.

When the switch module 14 switches the first primary reception signal to be communicated by the first antenna 11 and switches the second primary reception signal to be communicated by the second antenna 12, the first antenna 11 communicates the first primary reception signal and the second diversity reception signal, the second antenna 12 communicates the second primary reception signal, and the third antenna 13 communicates the first diversity reception signal.

When the switch module 14 switches the first primary reception signal to be communicated by the third antenna 13 and switches the second primary reception signal to be communicated by the first antenna 11, the first antenna 11 communicates the first diversity reception signal and the second primary reception signal, the second antenna 12 communicates the second diversity reception signal, and the third antenna 13 communicates the first primary reception signal.

With further reference to FIG. 10 and FIG. 11, in some embodiments, the first antenna 11 can be configured to communicate the first diversity reception signal and the second diversity reception signal, the second antenna 12 can be configured to communicate the first primary reception signal, and the third antenna 13 can be configured to communicate the second primary reception signal; or the first antenna 11 can be configured to communicate the first primary reception signal and the second diversity reception signal, the second antenna 12 can be configured to communicate the first diversity reception signal, and the third antenna 13 can be configured to communicate the second primary reception signal.

In some embodiments, the switch module 14 can be configured to control the first primary reception signal to be communicated by the first antenna 11 or the third antenna 13. The switch module 14 can be further configured to control the second primary reception signal to be communicated by the second antenna 12 or the third antenna 13.

In the default state, the switch module 14 is configured to control the third antenna 13 to communicate the first primary reception signal and control the second antenna 12 to communicate the second primary reception signal. That is, in the default state, the third antenna 13 is configured to communicate the first primary reception signal, the second antenna 12 is configured to communicate the second primary signal, and the first antenna 11 is configured to communicate the first diversity reception signal and the second diversity reception signal.

When the switch module 14 switches the first primary reception signal to be communicated by the first antenna 11 and switches the second primary reception signal to be communicated by the second antenna 12, the first antenna 11 communicates the first primary reception signal and the second diversity reception signal, the second antenna 12 communicates the second diversity reception signal, and the third antenna 13 communicates the second primary reception signal.

While several embodiments of the present disclosure have been described above in a specific and detailed manner, the protection scope of the present disclosure cannot be construed as being limited to these embodiments. It should be noted that, those skilled in the art can make various variants and improvements without departing from the concept of the present disclosure, and these variants and improvements shall fall within the protection scope of present disclosure as defined by the claims as attached.

What is claimed is:

1. An antenna device, comprising:

a first antenna comprising a first radiator, wherein the first radiator comprises a first branch and a second branch that are connected to each other, the second branch bending and extending from an end of the first branch, wherein the first antenna supports both a first operation mode and a second operation mode, wherein the first antenna covers a bandwidth greater than 190 MHz by using the first operation mode and the second operation mode together;

wherein the first operation mode has a central frequency of 720 MHZ, and the second operation mode has a central frequency of 910 MHz or 1,176 MHz.

2. The antenna device according to claim 1, wherein:

a length of the first branch is smaller than a length of the second branch;

a total length of the first branch and the second branch is a quarter of a wavelength corresponding to the central frequency of the first operation mode;

the first antenna comprises a first ground point and a first feed point, the first feed point is located at the second branch and is connected to a feed, and the first ground point is located at an end of the first branch; and a length from the first feed point to a free end is a quarter of a wavelength corresponding to the central frequency of the second operation mode.

3. The antenna device according to claim 1, further comprising a second antenna and a third antenna, wherein the antenna device is configured to implement a full-band 4-th Generation Mobile Communication Technology (4G) low-frequency and 5-th Generation Mobile Communication Technology (5G) low-frequency dual connectivity through the first antenna, the second antenna, and the third antenna.

4. The antenna device according to claim 1, further comprising a second antenna and a third antenna, wherein the antenna device is configured to implement a full-band low-frequency carrier aggregation through the first antenna, the second antenna, and the third antenna.

5. The antenna device according to claim 1, further comprising a second antenna and a third antenna, wherein the antenna device is configured to implement a partial-band 4G low-frequency and Global Positioning System (GPS) L5 dual connectivity through the first antenna, the second antenna, and the third antenna.

6. The antenna device according to claim 1, further comprising a second antenna and a third antenna, wherein the antenna device is configured to implement a partial-band 5G low-frequency and GPS L5 dual connectivity through the first antenna, the second antenna, and the third antenna.

7. A mobile terminal, comprising a main body and the antenna device according to claim 1, the main body comprising a short edge and a side edge, the first branch and the second branch being respectively disposed at the short edge and the side edge that are adjacent to each other.

8. A mobile terminal, comprising a first antenna, a second antenna, and a third antenna, wherein:

the mobile terminal is configured to communicate a first band signal and a second band signal through the first antenna, the second antenna, and the third antenna, to implement a full-band 4G low-frequency and 5G low-frequency dual connectivity or a full-band low-frequency carrier aggregation, or the mobile terminal is configured to communicate the first band signal and the second band signal through the first antenna, the second antenna, and the third antenna, to implement a partial-band 4G low-frequency and GPS L5 dual connectivity or a partial-band 5G low-frequency and GPS L5 dual connectivity; and the first band signal comprises a first transmission signal, a first primary reception signal, and a first diversity reception signal, and the second band signal comprises a second transmission signal, a second primary reception signal, and a second diversity reception signal.

9. The mobile terminal according to claim 8, wherein:

the first band signal is a 4G band signal, and the second band signal is a 5G band signal; or the first band signal is a 5G band signal, and the second band signal is a 4G band signal.

10. The mobile terminal according to claim 9, wherein:

the first antenna is configured to communicate the first diversity reception signal and the second diversity reception signal;

the second antenna is configured to communicate the second primary reception signal; and the third antenna is configured to communicate the first primary reception signal.

11. The mobile terminal according to claim 9, wherein:

the first antenna is configured to communicate the first diversity reception signal and the second primary reception signal;

the second antenna is configured to communicate the first primary reception signal; and the third antenna is configured to communicate the second diversity reception signal.

12. The mobile terminal according to claim 9, wherein:

the first antenna is configured to communicate the first diversity reception signal and the second diversity reception signal;

the second antenna is configured to communicate the second primary reception signal; and the third antenna is configured to communicate the first primary reception signal.

13. The mobile terminal according to claim 9, wherein:

the first antenna is configured to communicate the first primary reception signal and the second diversity reception signal;

the second antenna is configured to communicate the second primary reception signal; and the third antenna is configured to communicate the first diversity reception signal.

14. The mobile terminal according to claim 9, wherein:

the first antenna is configured to communicate the first diversity reception signal and the second primary reception signal;

the second antenna is configured to communicate the second diversity reception signal; and the third antenna is configured to communicate the first primary reception signal, or wherein:

the first antenna is configured to communicate the first diversity reception signal and the second diversity reception signal;

the second antenna is configured to communicate the second primary reception signal; and the third antenna is configured to communicate the first primary reception signal.

15. The mobile terminal according to claim 9, wherein:

the first antenna is configured to communicate the first primary reception signal and the second diversity reception signal;

the second antenna is configured to communicate the first diversity reception signal; and the third antenna is configured to communicate the second primary reception signal.

16. The mobile terminal according to claim 9, wherein the first transmission signal is emitted by any antenna configured to receive the first primary reception signal or the first diversity reception signal, and wherein the second transmission signal is emitted by any antenna configured to receive the second primary reception signal or the second diversity reception signal, the antenna configured to emit the first transmission signal being different from the antenna configured to emit the second transmission signal.

17. The mobile terminal according to claim 8, wherein:

each of the first band signal and the second band signal is a 4G band signal; or each of the first band signal and the second band signal is a 5G band signal.

18. The mobile terminal according to claim 8, wherein:

the first band signal is a 4G band signal, and the second band signal is a GPS-L5 band signal; or the first band signal is a 5G band signal, and the second band signal is a GPS-L5 band signal; or the first band signal is a GPS-L5 band signal, and the second band signal is a 4G band signal; or the first band signal is a GPS-L5 band signal, and the second band signal is a 5G band signal.

* * * * *